United States Patent Office 3,386,832
Patented June 4, 1968

3,386,832
METHOD FOR AGING WHISKEY
John T. McCabe, Jenkintown, Pa., assignor to Continental Distilling Corporation, Philadelphia, Pa., a corporation of Delaware
No Drawing. Filed Nov. 26, 1963, Ser. No. 326,250
2 Claims. (Cl. 99—48)

ABSTRACT OF THE DISCLOSURE

Method for aging whiskey in which the whiskey is aged in used charred oak barrels in the presence of charred slabs of oak having a minimum cross sectional dimension of at least ¾ of an inch and having a total combined surface area equal to from 25 to 50% of the interior surface of the barrel.

---

This invention relates to the aging of whiskey, and is particularly concerned with the aging of American whiskeys such as bourbon and rye whiskeys.

As is well known, whiskeys are customarily aged in barrels, most desirably barrels made of white oak, and the interior surfaces of the barrel are charred. The use of fresh barrels for each batch of whiskey aged provides effective aging action, as is well recognized. However the use of fresh barrels for each batch of whiskey represents a substantial expense in the aging of whiskey and also presents a problem because of the fact that white oak, especially of good quality, is becoming scarcer. For these and certain other reasons, many proposals have been made either to eliminate the use of the conventional oak barrel, or to utilize the oak wood in some other form, for instance chips or shavings in an attempt to provide for more economical use of the wood. The prior art proposals, generally speaking, have not been adopted, because they have not been fully effective or have introduced certain disadvantages, some of these matters being touched on more fully hereinafter following a description of the present invention and the preferred method of carrying it into practice.

In one of its most important aspects, the present invention is based upon a discovery. Thus it has been found that both good quality aging and more efficient use of the aging wood can be obtained by employing in combination the charred wood of previously used barrels, together with a certain amount of fresh wood in the form of pieces of certain dimensions and having the surfaces thereof charred in the manner described hereinafter.

In further explanation it is pointed out that in the use of a charred white oak barrel for aging bourbon and rye whiskeys, the aging capability of the charred wood within the barrel is diminished as a result of the aging of a batch of whiskey to a value less than half of the original aging capability for those types of whiskeys, for instance to a value on the order of ⅓ thereof, when measured in terms of certain of the congeners or flavor contributing constituents which normally occur in whiskeys aged in new charred barrels. Thus, attempts to age bourbon and rye whiskeys merely by placing it in used barrels is not satisfactory because at least some charred new wood is required to produce satisfactory flavor.

In accordance with the discovery on which the present invention is based, it has been found that the deficiency in aging capability of a used barrel may be made up, or if desired, even somewhat over compensated by introducing into the barrel certain charred wood pieces having a total charred surface area representing from about 25 to 50 percent of the charred area of a new barrel of the same size. In this way a batch of whiskey of predetermined volume may be effectively aged with considerably less total new charred wood surface than is the case in a fresh barrel, and in addition a further economy is secured by virtue of the repeated use of the barrel.

While not all of the reasons why this system of aging whiskey is effective are understood, certain factors seem clear from analysis and experimental work and will be pointed out more fully herebelow. However, before proceeding with that discussion and with the examples illustrative of the technique of the invention, there is here first given a brief description of a typical treatment according to the invention.

In such a typical treatment, a used barrel of approximately 50 gallons capacity is employed. Through a bunghole provided in the barrel a plurality of charred white oak slabs are introduced into the barrel. These slabs may be of various dimensions but should not be so small as to pack down without appreciable interstices. Thus the slabs are preferably of a length at least equal to a substantial fraction of the diameter or length of the barrel. For example, slabs having a length from about ½ the diameter of the barrel up to a length approaching the length of the barrel are well suited to the purpose. Because of the convexity of the side wall of the barrel, with the barrel positioned on its side, slabs of the length referred to will assume positions in which the slabs are supported at their ends out of contact with the side wall of the barrel, and in which, for the most part, the side, edge and end surfaces of the slabs are exposed to the whiskey in the barrel. This provides good exposure of the charred surfaces of the slabs to the whiskey and avoids the type of piling up on the bottom of the barrel occurring with chips or shavings. Concentrated piling up of small pieces such as chips or the like, precludes proper circulation of the whiskey over the surfaces of the wood as is required for proper aging of the whiskey.

Although insofar as the aging process itself is concerned the slabs may be of considerable thickness, for the sake of avoiding excessively large openings in the barrels and for economy of wood and also economy of barrel capacity, it is preferred to use slabs having cross sectional dimensions not greater than about 3 inches.

It is also of importance that the slabs have a minimum cross sectional dimension of at least ¾ inch. Typical pieces to be employed are slabs ¾ to one inch in thickness and about two inches in width. The slabs may vary in width down to about 1½ inches but are preferably at least 2 inches in width.

As compared with shavings or chips, the surface area of slabs of dimensions such as those above referred to is much more effective and uniform in its action. Indeed, with shavings or chips it is not even possible to accurately measure or compute the available surface area, and this uncertainty, together with the tendency of shavings or chips to pack down makes the result unpredictable. Shavings and chips are also deficient for another reason mentioned herebelow following the description of the charring contemplated according to the invention.

In the practice of the present invention, it is of importance that all of the surfaces of the slabs or pieces be charred, including not only the side faces and the edges, but also the ends of the slabs, because the exposure of the whiskey to uncharred wood is not desirable in the aging of bourbon and rye whiskeys, and even the end surfaces, if left uncharred would adversely influence the againg process.

It should further be noted that the minimum cross sectional dimension of the slabs bears an important relation to the fact that the slabs are charred and used in the charred condition. The proper degree of charring requires a penetration of the char to an appreciable depth in the surface of the wood, for instance to a depth of about ¼ inch. This charring action produces chemical modifications of various constituents of the wood such as the cellulose, wood sugars and lignins. The effect of such modifications is to develop certain reaction products which are important in the aging process and this is evidenced by the development of a so-called "red layer" which is clearly visible if a piece of the charred wood is cut to disclose the section. The red layer shows up just below the charred layer itself. If the cross sectional dimension of the slabs is less than ¾ inch, there is insufficient wood remaining at the core of the piece to provide the desired red layer. Since shavings and chips commonly have sectional dimensions equal to only a minor fraction of an inch, such small pieces cannot develop the important red layer and therefore do not function in the aging process in the manner of charred slabs.

Examples

Comparative examples of aging typical bourbon whiskeys [1] were run in three categories, as follows:

(I) The whiskey was aged for 3½ years in used oak barrels containing charred new oak slabs according to the present invention.

(II) The whiskey was aged for 3½ years in used oak barrels, without the presence of the charred slabs contemplated according to the present invention.

(III) The whiskey was aged for 3½ years in new charred oak barrels.

In each category a plurality of representative lots or barrels were run and in each lot the new whiskey prior to deposit in the barrels was distilled in the same manner from the same mash bills under identical conditions of fermentation, and the various lots were all barrelled at the same proof, namely 110 proof. All barrels in each category were stored under identical warehousing conditions for the period of 3½ years of aging.

The lots in category I—conforming with the present invention—were placed in barrels containing charred wood slabs having total surface area approximating 35% of the interior charred area of the barrels used. The slabs were 2 inches wide and of 1 inch thickness. The slabs were charred to a depth of about ¼ inch.

The following table gives the average chemical analyses of the various lots or barrels in each category:

|  | Bourbon Whiskey Reused Barrels With Charred New Slabs | Bourbon Whiskey Reused Barrels | Bourbon Whiskey New Barrels |
|---|---|---|---|
| (a) Proof | 109.9 | 110.0 | 110.1 |
| (b) Color (Helige) | 2.8 | 0.3 | 2.4 |
| (c) ph | 3.66 | 3.80 | 3.70 |
| (d) Total Aldehydes | 6.00 | 5.20 | 5.40 |
| (e) Total Esters | 23.6 | 18.3 | 30.5 |
| (f) Fusel Oil | 155.0 | 156.7 | 154.3 |
| (g) Total Acids | 37.7 | 18.2 | 44.8 |
| (h) Total Solids | 142.5 | 36.5 | 123.5 |
| (i) Tannins | 48.7 | 11.0 | 44.6 |

NOTE.—All values for items (d) to (i) inclusive expressed in parts per hundred thousand at 100 proof.

From the above table it will be seen that those characteristics which are of special importance to the development of odor and taste (for instance the total solids and the content of esters, acids and tannins) are strikingly influenced by the type of cooperage used. The development of color also accompanies the development of the odor and taste producing constituents, as will be seen from the table. Certain other factors or characteristics (for instance Proof, ph, aldehydes and fusil oil) remain substantially the same regardless of the type of cooperage.

More specifically, it will be seen from the above table that the total solids, which are made up of extratives of the wood, was well developed by the aging in the used barrels containing charred new oak slabs according to the present invention, whereas the use of used barrels not containing slabs did not develop even half the content of total solids. The content of acids and tannins in the whiskeys aged according to the present invention was comparable to whiskeys aged in new barrels, whereas the acids and tannins content in the whiskeys aged in used barrels without charred new staves was much lower. Favorable ester development is also manifested by the whiskeys aged according to the present invention.

The total solids content, the color and the tannin content of the whiskeys aged according to the present invention indicate more rapid aging than with the whiskeys aged in new barrels.

The whiskeys represented in the above table were also given organoleptic (odor and taste) tests. This was done by a panel of six experts familiar with all types of whiskeys, the tests being conducted "blindfold." The findings are summarized as follows:

The "slab-barrel" whiskeys aged according to the present invention have odor and taste characteristics identical with those of the whiskeys aged in new cooperage and distinctly different from the whiskeys which were aged in used barrels without the charred new oak slabs. The "slab-barrel" whiskeys were also judged to have matured to a greater degree than the whiskeys aged in new cooperage.

I claim:

1. A method for treating whiskey which comprises aging the whiskey in a charred oak barrel previously used for aging whiskey and in the presence of a plurality of oak slabs disposed in the barrel, the slabs being of a length equal at least to a major fraction of the diameter of the barrel, having a minimum cross section dimension of at least ¾ inch, and having a combined total surface area equal to from 25% to 50% of the interior surface of the barrel, the entirety of said total surface area being charred.

2. A method for treating whiskey which comprises aging the whiskey in a charred oak barrel previously used for aging whiskey and in the presence of a plurality of pieces of oak disposed in the barrel, said pieces having a minimum cross sectional dimension of at least ¾ inch and the pieces having a total surface area equal to from 25% to 50% of the interior surface of the barrel, and the entirety of said total surface area being charred.

References Cited

UNITED STATES PATENTS

| 1,014,883 | 1/1912 | Klein | 99—48 X |
| 2,045,859 | 6/1936 | Klein | 99—48 X |
| 2,145,243 | 1/1939 | Bagby | 99—48 |
| 2,807,547 | 9/1957 | Nickol | 99—48 |

ALVIN E. TANENHOLTZ, *Primary Examiner.*

LOUIS A. MONACELL, RAYMOND N. JONES,
*Examiners.*

D. M. NAFF, *Assistant Examiner.*

---

[1] All of the whiskeys distilled from a bourbon mash are herein referred to as "bourbon whiskeys" although under existing federal labeling regulations, "bourbon whiskey" in order to be designated as such, must be aged entirely in new charred oak barrels.